United States Patent Office 3,448,121
Patented June 3, 1969

3,448,121
FLUORINATED OXETANES
Cyril Woolf, Morristown, N.J., and Gary Lee Gard, Beaverton, Oreg., assignors to Allied Chemical Corporation, New York, N.Y., a corporation of New York
No Drawing. Filed Aug. 7, 1967, Ser. No. 658,653
Int. Cl. C07d 3/00; B01j 1/10
U.S. Cl. 260—333          3 Claims

ABSTRACT OF THE DISCLOSURE

This specification discloses novel fluorinated oxetanes having a pentafluorothio substituent. These oxetanes are prepared by reacting a perhalogenated acetone wherein at least one fluorine atom is attached to each carbon atom adjacent to the carbonyl group with a pentafluorothio-substituted olefin compound in the presence of actinic radiation. These compounds are thermally stable and are chemically inert to strong acids and bases. They are useful as heat transfer media, functional fluids and when added to known gaseous dielectrics, enhance their dielectric strength.

Oxetanes are a class of known cyclic ethers which are useful as chemical intermediates, solvents and plasticizers. Recently, investigators have prepared fluorinated derivatives of these cyclic ethers. However, not all known fluorinated oxetanes exhibit satisfactory thermal stability of chemical inertness.

It is an object of the present invention to provide new fluorinated oxetanes having outstanding thermal stability and chemical inertness.

It is a further object to provide a process for the preparation of these new oxetanes.

Other objects will become apparent from the following detailed description thereof.

The novel fluorinated oxetanes of the present invention are selected from fluoro-oxetanes having the structural formulas:

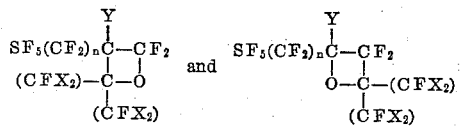

wherein Y can be hydrogen, fluorine or chlorine, X is a halogen independently selected from the group consisting of fluorine and chlorine and $n$ is an integer of 0 to 2. These oxetanes are thermally stable fluids and are not decomposed in the presence of strong acids or bases over prolonged periods.

These fluorinated oxetanes can be prepared by reacting a perhalogenated acetone having the formula $$CFX_2-\overset{O}{\overset{\|}{C}}-CFX_2$$

wherein X is as described above with a pentafluorothio-substituted olefin compound having the formula $$SF_5(CF_2)_nCY=CF_2$$

wherein Y and $n$ are as described above, in the presence of actinic radiation.

Suitable perhalogenated acetones include those wherein at least one fluorine atom is attached to each carbon atom adjacent to a carbonyl group, such as

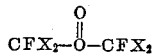
hexafluoroacetone

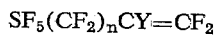
chloropentafluoroacetone

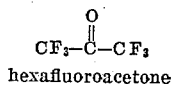
sym—dichlorotetrafluoroacetone

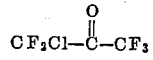
1,1-dichlorotetrafluoroacetone $$CFCl_2-\overset{O}{\overset{\|}{C}}-CF_2Cl$$
1,1-dichloro-3-chlorotrifluoroacetone $$CFCl_2-\overset{O}{\overset{\|}{C}}-CFCl_2$$
1,1,3,3-tetrachlorodifluoroacetone Pentafluorothio-substituted olefin compounds have been disclosed by Ray in U.S. Patent 3,131,217, issued Apr. 28, 1964 and are prepared by removing one hydrogen atom and one chlorine atom from adjacent carbon atoms by refluxing the addition product obtained by adding chlorothiopentafluoride to a suitable olefin by refluxing in alcoholic caustic solution. Olefins suitable for use in the present invention include, for example, $$SF_5CF=CF_2$$
2-pentafluorothiotrifluoroethylene $$SF_5CF_2CF=CF_2$$
3-pentafluorothiopentafluoropropene-1

$$SF_5CH=CF_2$$
2-pentafluorothio-1,1-difluoroethylene $$SF_5CCl=CF_2$$
2-pentafluorothio-2-chlorodifluoroethylene $$SF_5CF_2CCl=CF_2$$
3-pentafluorothio-2-chlorotetrafluoropropene-1

$$SF_5CF_2CH=CF_2$$
3-pentafluorothio-1,1,3,3-tetrafluoropropene-1

$$SF_5CF_2CF_2CCl=CF_2$$
4-pentafluorothio-2-chlorohexafluorobutene-1

$$SF_5CF_2CF_2CF=CF_2$$
4-pentafluorothioheptafluorobentene-1

Generally the reaction products of the perhalogenated acetone and pentafluorothio-substituted olefin compound will include an isomeric mixture of products, as can be further illustrated by the equation given below:

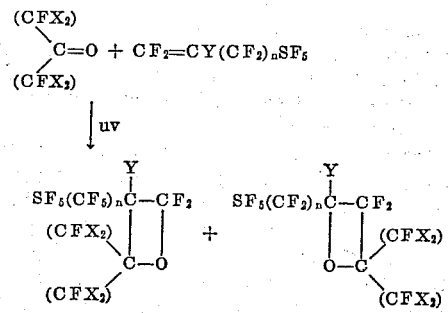

Illustrative compounds of the invention include:

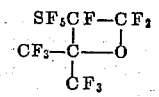
2,2-bis(trifluoromethyl)-3-pentafluorothiotrifluorooxetane

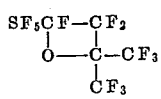

2,2-bis(trifluoromethyl)-4-pentafluorothiotrifluorooxetane

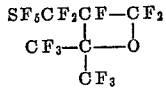

2,2-bis(trifluoromethyl)-3-pentafluorothiodifluoro-
methyltrifluorooxetane

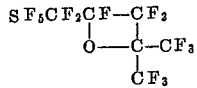

2,2-bis(trifluoromethyl)-4-pentafluorothiodifluoromethyl-
trifluorooxetane

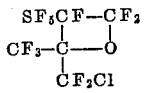

2-trifluoromethyl-2-chlorodifluoromethyl-3-pentafluoro-
thiotrifluorooxetane

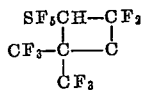

2,2-bis(trifluoromethyl)-3-pentafluorothio-4,4-
diffuorooxetane

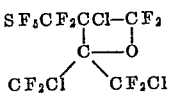

2,2-bis(chlorodifluoromethyl)-3-pentafluorothiodifluoro-
methyl-3-chlorodifluorooxetane

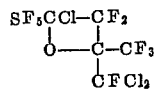

2-trifluoromethyl-2-dichlorofluoromethyl-4-pentafluoro-
thio-4-chlorodifluorooextane

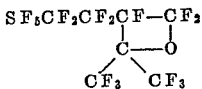

2,2-bis(trifluoromethyl)-3-pentafluorothiotetrafluoro-
ethyltrifluorooxetane

The molar ratio of the reactants is not critical and acceptable yields can be obtained by employing equimolar quantities. However, it is preferred that an excess of the perhaloacetone be employed. In general, a molar ratio of from 1.5 to 10.0 of perhaloacetone to pentafluorothio-substituted olefin compound can be employed, the preferred range being from 2.0 to 6.0.

The reaction mixture is exposed to actinic radiation, preferably that emitted by high intensity ultraviolet light. The ultraviolet light can be supplied conveniently by a mercury arc vapor lamp.

The reaction can be carried out in liquid or gas phase, depending upon the boiling points of the reactants and the temperature employed. At temperatures below the boiling point of the reactants, the product can be recovered from the reaction mixture by fractional distillation. Gas phase operation can be carried out at temperatures above the boiling point of the reactants and below the decomposition temperature of any of them. The temperature can be above the boiling point of the reactants but below the boiling point of the fluorinated product. Generally temperatures between about —70° C. and 150° C. are suitable and the preferred temperature range is from —30° C. to 50° C.

A typical gas phase operation is carried out in semi-batch fashion by vaporizing the reaction mixture in a reactor, passing the vapors to a source of actinic radiation and condensing the products for return to the reactor. There the higher boiling products accumulate while unreacted starting materials are recycled back to the source of actinic radiation.

Reaction time can vary over a wide range, typically from about 10 hours to about 5 days.

The fluorinated oxetanes of the invention are useful as heat transfer media and as functional fluids, such as hydraulic fluids, dielectrics and the like. They can also be used as specialty solvents, as for fluorine-containing compounds. Certain of the compounds disclosed herein when added in minor amounts to known gaseous dielectrics, including nitrogen and sulfur hexafluoride, improve the dielectric strengths over those of the gaseous dielectrics alone, as disclosed in a copending application of Woolf, Gard and Shaw Ser. No. 658,621, filed concurrently herewith.

The invention can be further illustrated by the following examples, but it is to be understood that the invention is not meant to be limited to the details disclosed therein.

In the examples, all parts are by weight.

Example 1

A cylindrical reaction vessel was equipped with a water cooled double wall immersion well and a solid carbon dioxide cooled condenser. A high pressure, quartz mercury lamp was placed into the well as a source of high intensity ultraviolet light. The condenser was fitted with an outlet and line connecting the bottom of the condenser to the reaction vessel for the return of the condensate to the reaction vessel. The Dry Ice cooled vessel was first charged with a reaction mixture composed of 700 parts of hexafluoroacetone and 272 parts of 2-pentafluorothiotrifluoroethylene at atmospheric pressure. The reaction mixture was then refluxed while exposed to the lamp for 12.5 hours when an additional 280 parts of hexafluoroacetone were added. The reaction was continued for 6.5 hours longer. The unreacted starting materials were distilled off and the reaction product was fractionally distilled.

104 parts of the product, boiling at 84–85° C. at 740 mm. of mercury, was collected. Elemental analysis was obtained as follows: Theoretical for $C_5F_{14}OS$: C, 16.0; F, 71.0; S, 8.6. Found: C, 14.7; F, 69.0; S, 8.8.

Infrared and nuclear magnetic analysis indicated that a major proportion of the product was 2,2-bis(trifluoromethyl) - 3 - pentafluorothiotrifluorooxetane. Vapor phase chromatographic analysis disclosed two products in an approximate ratio of 9:1. The identity of the minor product as 2,2-bis(trifluoromethyl)-4-pentafluorothiotrifluorooxetane was confirmed by infrared atnalysis.

A series of chemical inertness tests were carried out as follows: a portion of 2,2-bis(trifluoromethyl)-3-penetafluorothiotrifluorooxetane was charged to a vessel containing 6 N potassium hydroxide. Examination of the mixture after three months at room temperature and after 42 hours at 125° C. by infrared analysis showed the compound to be substantially unchanged. Another portion of 2,2 - bis(trifluoromethyl) - 3-pentafluorothiotrifluorooxetane was charged to a vessel containing concentrated sulfuric acid. The compound remained unchanged after three months at room temperature and after 23 hours at 115° C.

2,2 - bis(trifluoromethyl) - 3 - pentafluorothiotrifluorooxetane was heated at 250° C. in a sealed glass tube for 70 minutes. Only a slight amount of the compound was decomposed.

Example 2

The procedure of Example 1 is followed substituting chloropentafluoroacetone as the acetone reactant. The product obtained is an isomeric mixture of 2-trifluoromethyl-2-chlorodifluoromethyl-3-pentafluorothiotrifluorooxetane and 2 trifluoromethyl-2-chlorodifluoromethyl-4-pentafluorothiotrifluorooxetane.

Example 3

The procedure of Example 1 is followed substituting 3-pentafluorothiopentafluoropropene-1 as the pentafluorothio-substituted reactant. The product obtained is an isomeric mixture of 2,2 - bis(trifluoromethyl) - 3 - pentafluorothiodifluoromethyltrifluorooxetane and 2,2-bis(trifluoromethyl) - 4-pentafluorothiodifluoromethyltrifluorooxetane.

Example 4

The procedure of Example 1 is followed employing as coreactants sym-dichlorotetrafluoroacetone and 2-pentafluorothio - 1,1 - difluoroethylene. The product obtained is an isomeric mixture of 2,2-bis(chlorodifluoromethly) - 3 - pentafluorothio-4,4-difluorooxetane and 2,2-bis(chlorodifluoromethyl)-3,3-difluoro-4-pentafluorothiooxetane.

We claim:

1. A compound selected from the group consisting of fluorinated oxetanes having the formula (a)
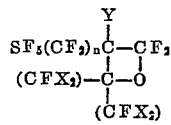

and (b)
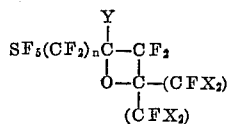

wherein Y is a member selected from the group consisting of hydrogen, chlorine and fluorine, X at each occurrence is a halogen independently selected from the group consisting of fluorine and chlorine and n is an integer from 0 to 2.

2. 2,2 - bis(trifluoromethyl)-3-pentafluorothiotrifluorooxetane.

3. 2,2 - bis(trifluoromehyl)-4-pentafluorothiotrifluorooxetane.

References Cited

UNITED STATES PATENTS

| | | | |
|---|---|---|---|
| 3,096,344 | 7/1963 | Case | 260—333 |
| 2,995,571 | 8/1961 | Harris | 260—333 |
| 2,995,572 | 8/1961 | Harris | 260—333 |
| 3,125,581 | 3/1964 | Drake et al. | 260—333 |
| 3,164,610 | 1/1965 | Davis | 260—333 |
| 3,210,298 | 10/1965 | Weissermel et al. | 260—333 X |
| 3,362,963 | 1/1968 | Woolf | 260—333 |

NORMA S. MILESTONE, *Primary Examiner.*

U.S. Cl. X.R.

204—158